(12) United States Patent
Zhang (10) Patent No.: US 12,549,880 B2
(45) Date of Patent: Feb. 10, 2026

(54) WATER-RESISTANT MICROPHONE ASSEMBLY

(71) Applicant: META PLATFORMS TECHNOLOGIES, LLC, Menlo Park, CA (US)

(72) Inventor: Jian Zhang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 123 days.

(21) Appl. No.: 17/739,332

(22) Filed: May 9, 2022

(65) Prior Publication Data

US 2023/0362526 A1 Nov. 9, 2023

(51) Int. Cl.
| | |
|---|---|
| *H04R 1/08* | (2006.01) |
| *B23K 26/21* | (2014.01) |
| *B23K 101/36* | (2006.01) |
| *B23K 103/04* | (2006.01) |

(52) U.S. Cl.
CPC ............ *H04R 1/086* (2013.01); *B23K 26/21* (2015.10); *B23K 2101/36* (2018.08); *B23K 2103/05* (2018.08)

(58) Field of Classification Search
CPC ...................................................... H04R 1/086
See application file for complete search history.

(56) References Cited

U.S. PATENT DOCUMENTS

| 5,092,458 | A | * | 3/1992 | Yokoyama | G03B 17/08 348/E5.026 |
|---|---|---|---|---|---|
| 5,812,496 | A | | 9/1998 | Peck | |
| 9,398,365 | B2 | | 7/2016 | Liu et al. | |
| 9,497,529 | B2 | | 11/2016 | Jeziorek et al. | |
| 9,961,452 | B2 | | 5/2018 | Salmon | |
| 10,469,941 | B2 | | 11/2019 | Dave et al. | |
| 2014/0283691 | A1 | * | 9/2014 | Furuuchi | B32B 1/00 96/12 |
| 2015/0050464 | A1 | * | 2/2015 | Ishii | B01D 63/087 521/142 |
| 2017/0325011 | A1 | * | 11/2017 | Kuki | B32B 27/281 |
| 2021/0092499 | A1 | * | 3/2021 | Fukushima | G06F 1/1688 |

* cited by examiner

*Primary Examiner* — Suhan Ni
(74) *Attorney, Agent, or Firm* — McDermott Will & Schulte LLP (57) ABSTRACT

The disclosed apparatus may include (1) an air-permeable membrane that is waterproof, (2) a washer adjacent to the air-permeable membrane, (3) a mesh coupled to the washer that covers an aperture defined by the washer, and (4) an adhesive coupled to a face of the washer distal from the air-permeable membrane. Various other methods, devices, and systems are also disclosed.

5 Claims, 11 Drawing Sheets

WATER-RESISTANT MICROPHONE ASSEMBLY

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Modern electronic devices are coming under increasing design and manufacturing constraints as volume, weight, and price are minimized while functional and cosmetic quality are maximized. For example, design for augmented-reality and virtual-reality systems, wearable devices, smartphones, tablets, etc., may favor several electronic components in a compact and lightweight form factor to improve usability and comfort.

Many device designs may incorporate microphones. For many designs, a microphone that is small, high-quality, and durable may be valuable or even essential. The present disclosure is generally directed toward apparatuses, devices, and methods of manufacture for water-resistant microphones. For example, a microphone assembly may include a waterproof membrane that can protect a microphone module from water and also act as a diaphragm to relay sound waves. The microphone assembly may also include a mesh (e.g., that protects the membrane and/or the microphone module from dust and/or intruding objects). To improve the quality and reduce the cost of manufacturing, the mesh may be laser-welded to a washer before the mesh is assembled with the membrane. An adhesive (e.g., a pressure-sensitive adhesive) may then be used to secure the mesh-membrane assembly (via the washer) to the device housing.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 6:
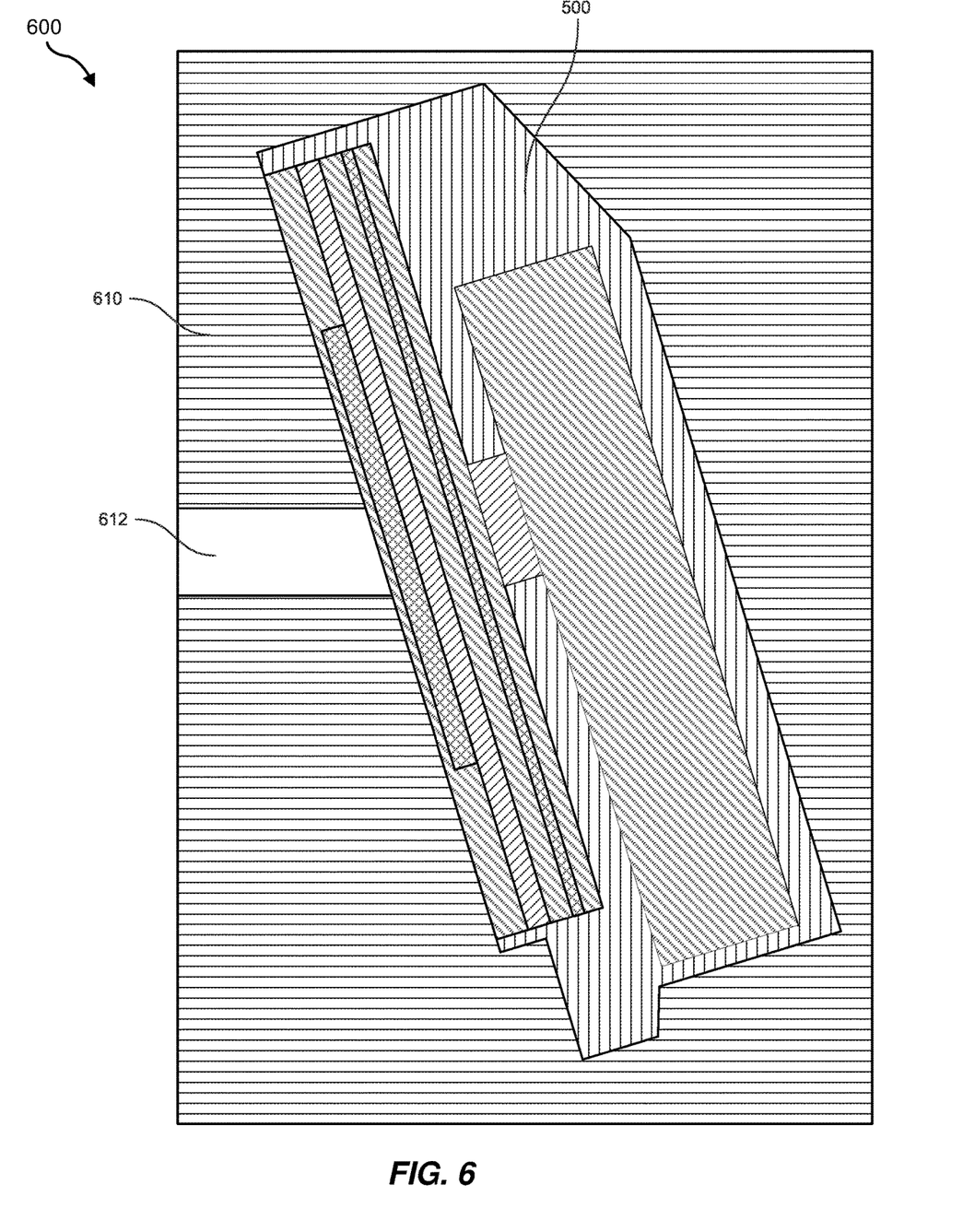
FIG. 6 is a cross section view of the assembly of FIG. 5 installed in a device housing.
Figure 7:
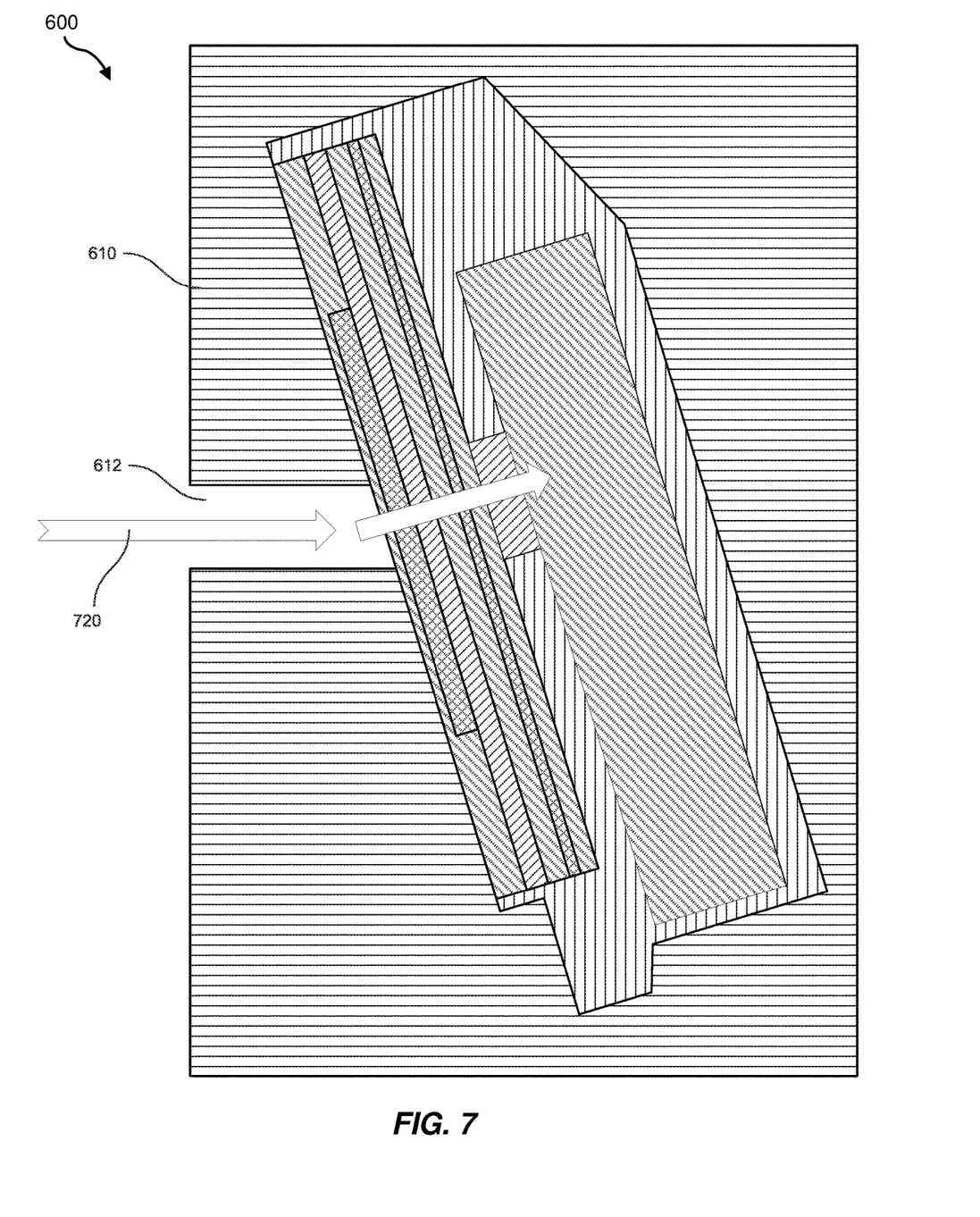
FIG. 7 is an illustration of sound waves propagating through the assembly of FIG. 6.
Figure 8:
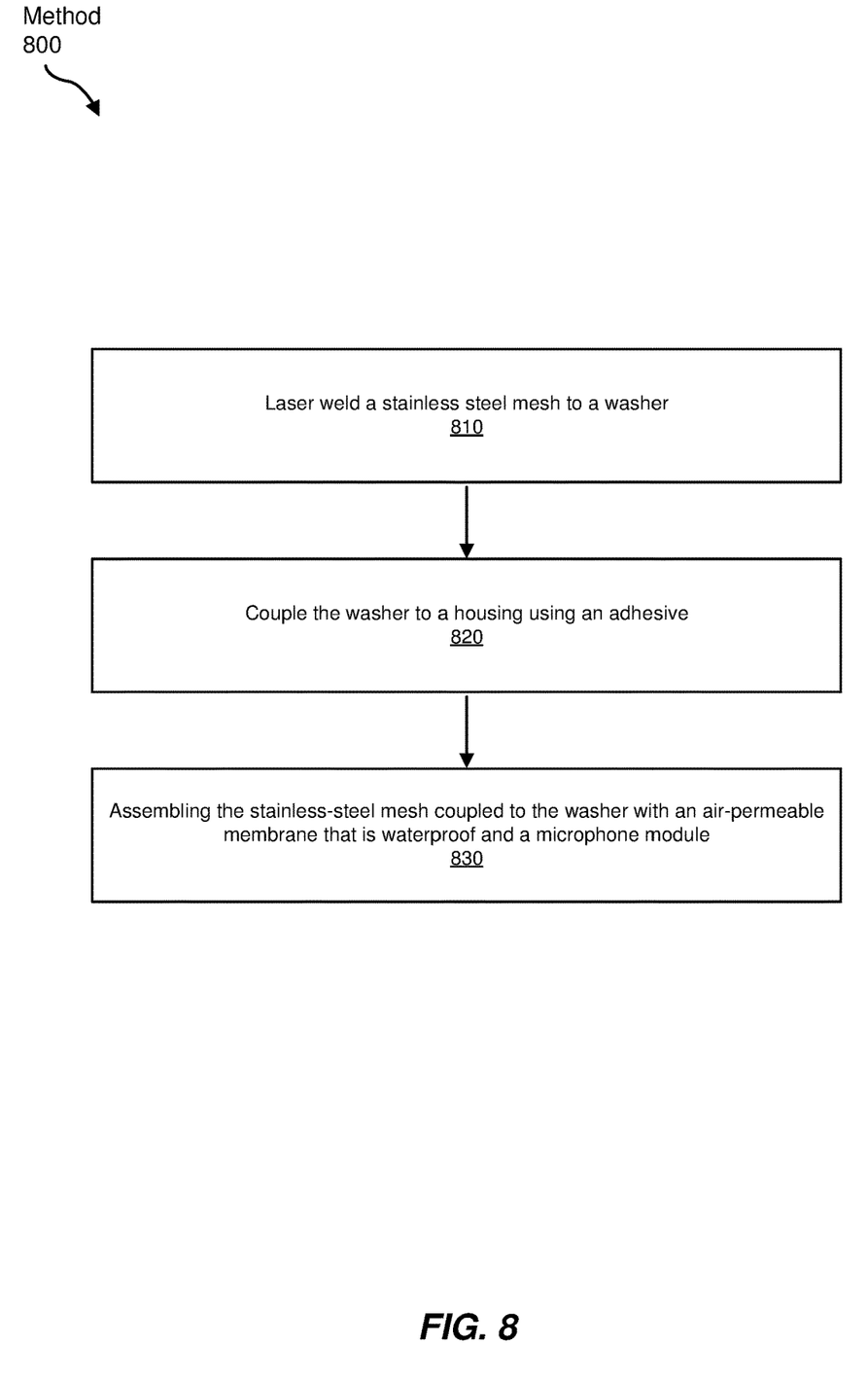
FIG. 8 is a flow diagram of an example method of manufacture for an assembly for water-resistant microphones.
Figure 9:
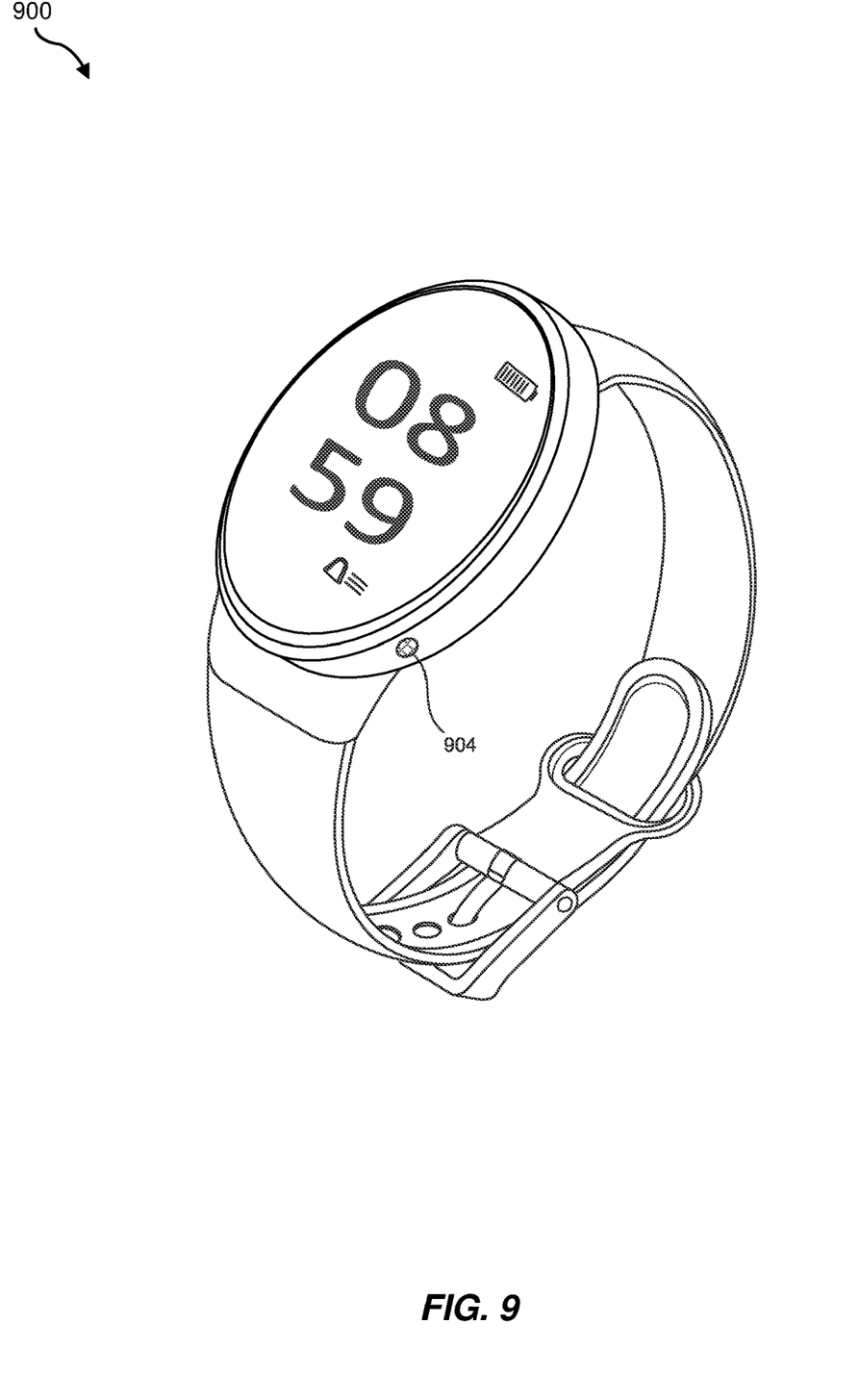
FIG. 9 is an illustration of an exemplary smartwatch that may be used in connection with embodiments of this disclosure.
Figure 10:
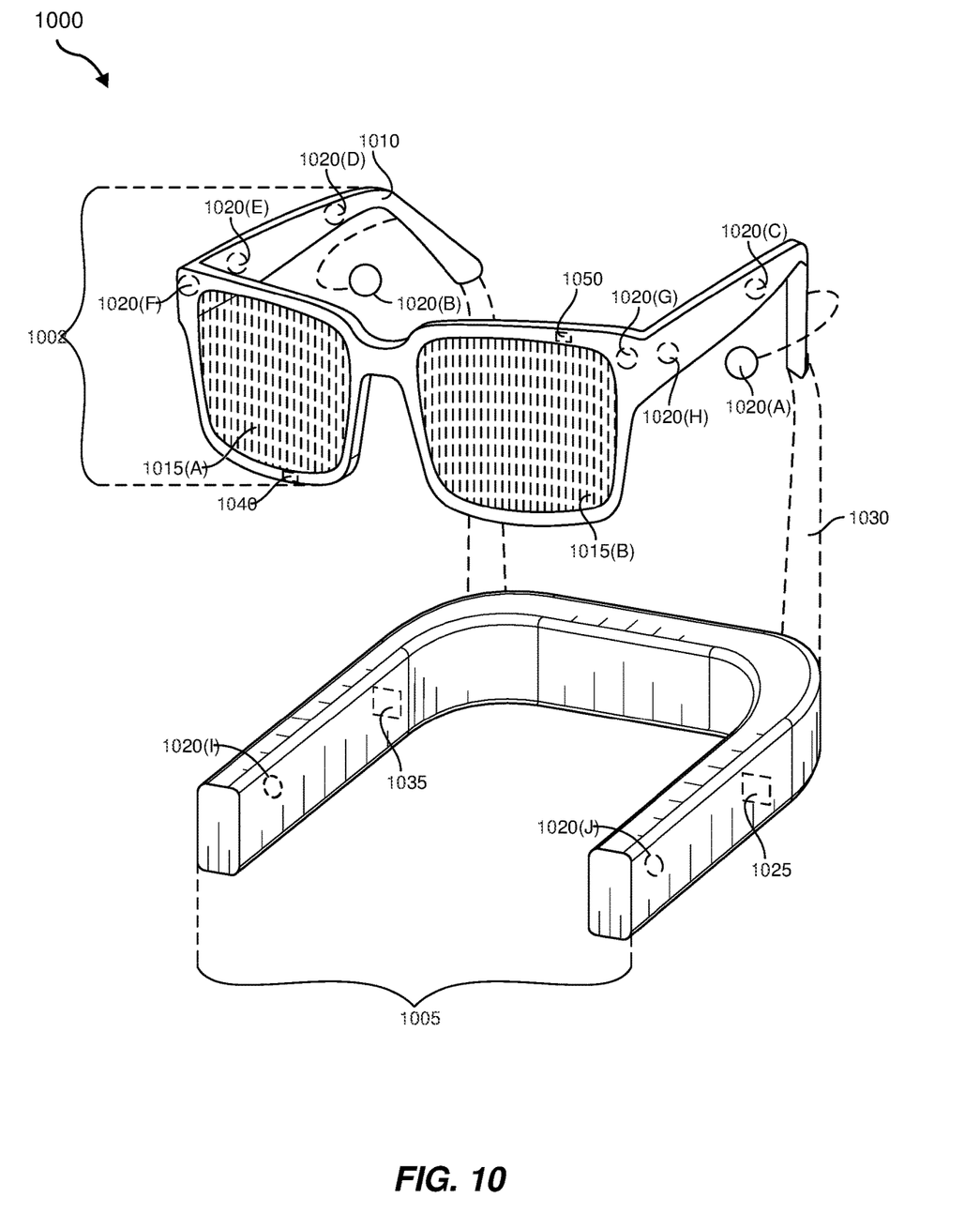
FIG. 10 is an illustration of exemplary augmented-reality glasses that may be used in connection with embodiments of this disclosure.
Figure 11:
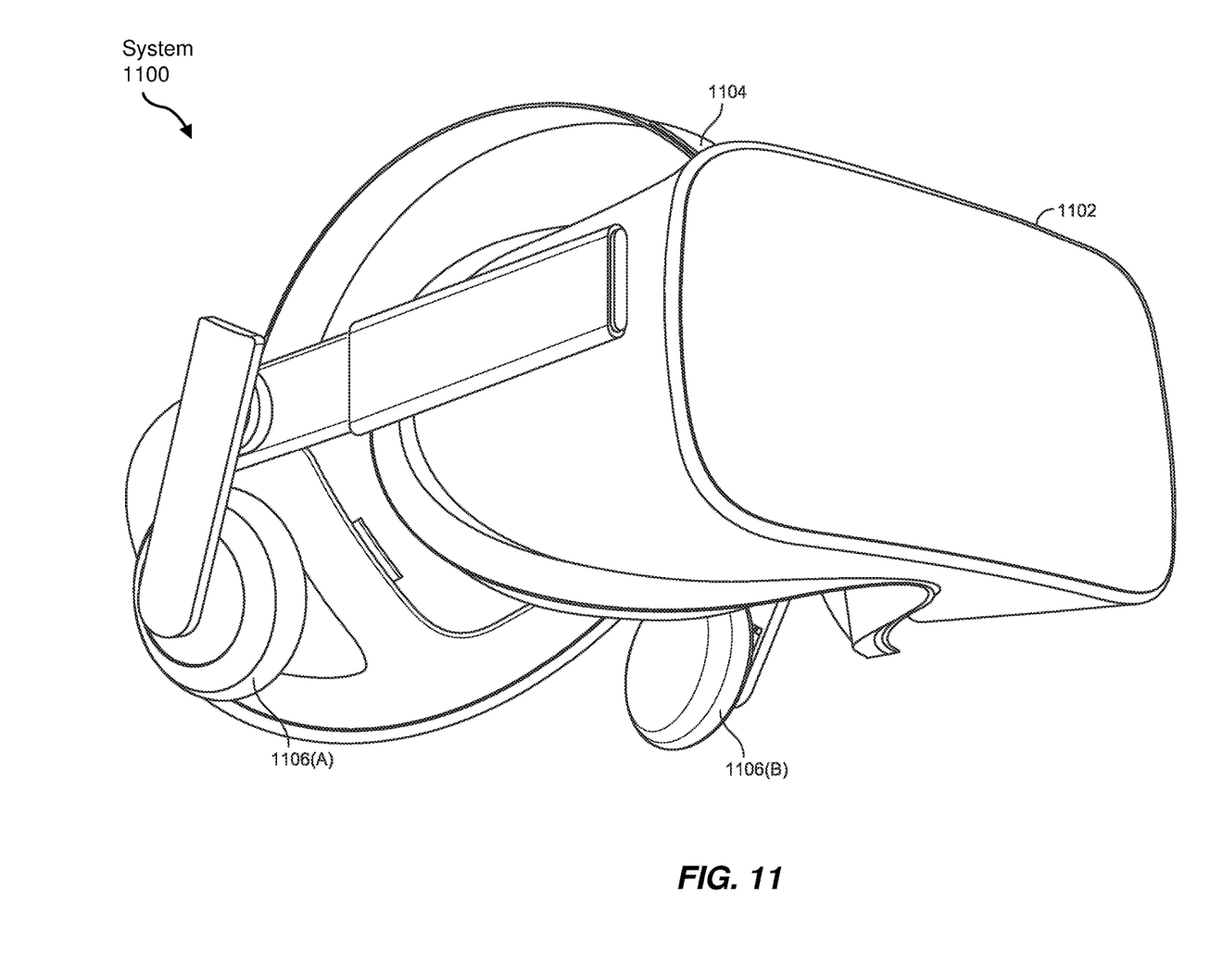
FIG. 11 is an illustration of an exemplary virtual-reality headset that may be used in connection with embodiments of this disclosure.

The following will provide, with reference to FIGS. 1-7, example assemblies and devices for water-resistant microphones; with reference to FIG. 8, an example method of manufacture of an assembly for water-resistant microphones; with reference to FIGS. 9-11, detailed descriptions of systems, including a smartwatch, augmented-reality glasses, and a virtual-reality headset which, in some examples, may incorporate an apparatus for water-resistant microphones in accordance with the present subject matter.

Figure 1:
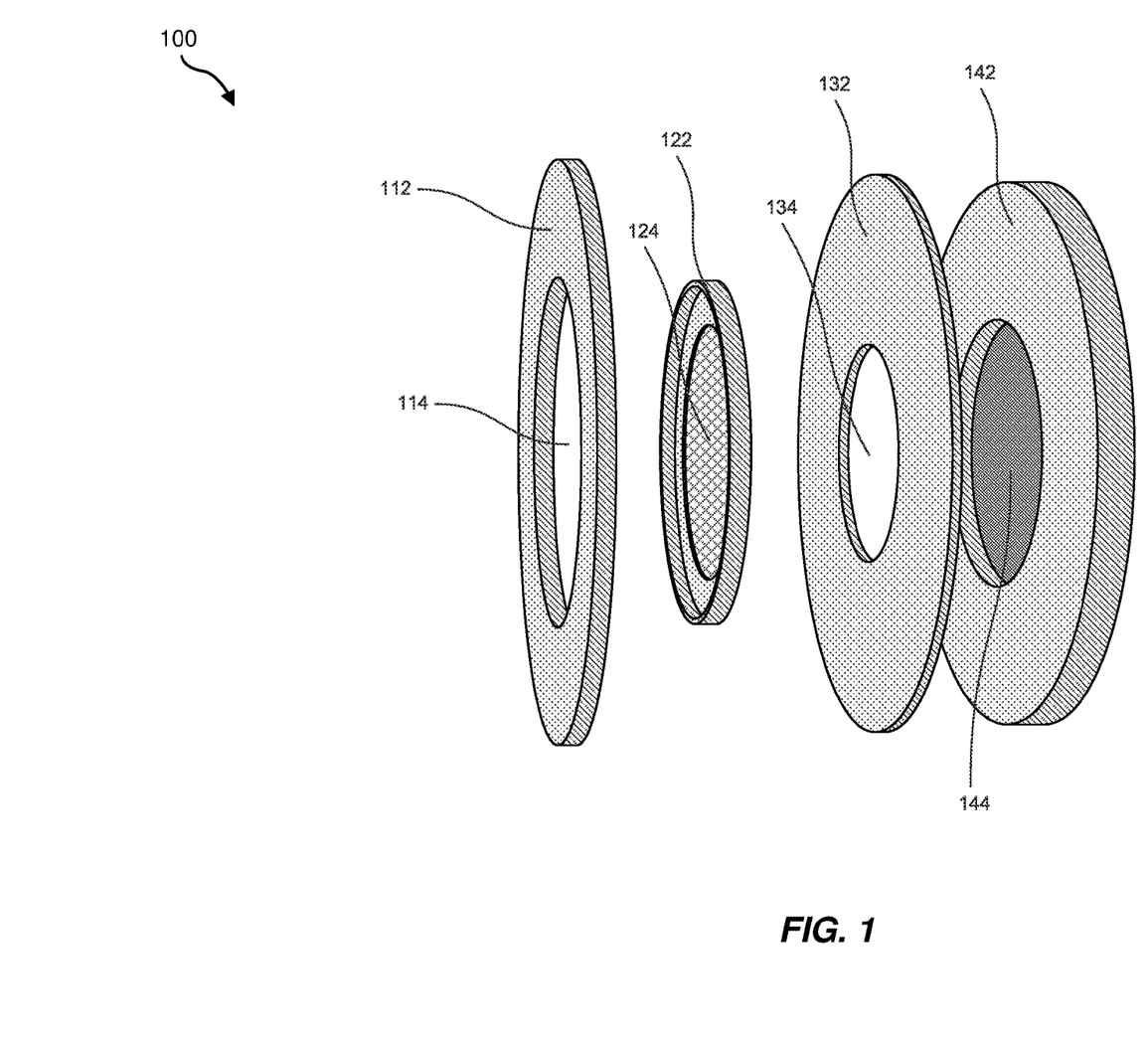
FIG. 1 is an exploded perspective view of an assembly for water-resistant microphones.

FIG. 1 provides an exploded perspective view of an assembly 100 for water-resistant microphones. As shown in FIG. 1, an assembly 100 may include an adhesive 112 (with an aperture 114), a mesh element 122 (with mesh 124), a washer 132 (with an aperture 134), and a membrane element 142 (with a membrane 144).

Membrane 144 may have any of a variety of properties. For example, membrane 144 may be an acoustic membrane. Thus, for example, membrane 144 may transfer sound by, e.g., vibrating when struck by sound waves coming from one side of the membrane and, thereby, reproducing the sound waves on the other side of the membrane. In some examples, membrane 144 may transfer sound waves with relatively little transmission loss. By way of examples, without limitation, membrane 144 may transfer sound waves from 100 hertz (Hz) to 10,000 Hz with an acoustic loss of less than about 5 decibels (dB), with an acoustic loss of less than about 4 dB, with an acoustic loss of less than about 3 dB, with an acoustic loss of less than about 2 dB, and/or with an acoustic loss of less than about 1.5 dB.

In some examples, membrane 144 may be waterproof. As used herein, the term "waterproof" may refer to impermeability to water under specified conditions. By way of examples, without limitation, membrane 144 may be waterproof at about 3 atmospheres (atm) or less, at about 4 atm or less, at about 5 atm or less, at about 7 atm or less, and/or at about 10 atm or less.

In some examples, membrane 144 may be air-permeable and/or act as a vent under specified conditions. For example, membrane 144 may allow air flow from one side of membrane 144 to the other side at least when there is a pressure differential between one side of membrane 144 and the other side of membrane 144. By way of examples, without limitation, when there is a pressure differential of 100 millibars, membrane 144 may allow air flow at a rate of at least 200 milliliters per minute per square centimeter (ml/min/cm$^2$), of at least 250 ml/min/cm$^2$, and/or of at least 300 ml/min/cm$^2$. By acting as a vent under pressure, membrane 144 may prevent damage to itself and/or to other components of a microphone assembly. For example, because a microphone module may be sealed off from ambient air except for venting via membrane 144, thermal expansion may cause an increase in air pressure that may damage the microphone module and/or membrane 144 except for the venting performed by membrane 144 due to its air permeability.

Membrane 144 may be made of any suitable material. In some examples, membrane 144 may be a polymer film. For example, membrane 144 may be a fluoropolymer film. In some examples, membrane 144 may be a polytetrafluoroethylene film. For example, membrane 144 may be an expanded polytetrafluoroethylene film.

As shown in FIG. 1, membrane 144 may be held in, framed within, and/or stretched across an aperture of membrane element 142. Membrane element 142 is pictured as ring-shaped; however, membrane element 142 may have any suitable shape. For example, the outer shape of membrane element 142 may be circular, as illustrated, square, rectangular, elliptical, and/or any other suitable shape. In some examples, the outer size and shape of membrane element 142 may approximate the outer shapes of elements 112 and/or 132 (such that the outer rims of elements 112, 132, and/or 142 sit flush together when assembled).

Membrane element 142 may be made of any suitable material or materials. By way of examples, without limitation, membrane element 142 may be include a polymer, metal (e.g., stainless steel), and/or any material suitable for adjoining to a washer.

Washer 132 may be made of any suitable material. In some examples, washer 132 may be made of a material suitable for coupling to mesh element 122 (e.g., by laser welding). For example, washer 132 may be made of stainless steel. Washer 132 may define aperture 134. In some examples, aperture 134 may have substantially the same shape as the aperture defined by membrane element 142 (sealed by membrane 144).

Washer 132 is pictured as ring-shaped; however, washer 132 may have any suitable shape. For example, the outer shape of washer 132 may be circular, as illustrated, square, rectangular, elliptical, and/or any other suitable shape. In some examples, the outer size and shape of washer 132 may approximate the outer shapes of elements 112 and/or 142 (such that the outer rims of elements 112, 132, and/or 142 sit flush together when assembled). In addition, aperture 134 may be circular, as illustrated, square, rectangular, elliptical, and/or any other suitable shape.

Mesh element 122 may be made of any suitable material. In some examples, mesh element 122 may be made of a material suitable for coupling to washer 132 (e.g., by laser welding). For example, mesh element 122 may be made of stainless steel. Mesh element 122 may define an aperture which may be occupied by mesh 124. In some examples, mesh element 122 may be large enough to completely cover aperture 134 when mesh element 122 is adjacent to and/or coupled with washer 132. In additional examples, mesh element 122 may include only, and be defined by, mesh 124 without any supporting structural element. In such examples, mesh 124 may be directly coupled (e.g., laser welded) to washer 132.

Mesh 124 may be of any material and design suitable to block particulate matter and/or objects. For example, mesh 124 may be fine enough to block dust and strong enough to stop intrusive objects (e.g., sharp objects) from passing and potentially degrading or damaging membrane 144 and/or a microphone module. Thus, for example, mesh 124 may prevent dust from reaching and sticking to membrane 144, thereby potentially dampening the ability of membrane 144 to vibrate and relay sound waves. In some examples, mesh 124 may be made of stainless steel. Mesh 124 may define pores of any suitable size. By way of examples, without limitation, the pores of mesh 124 may be about 100 microns or less, about 70 microns or less, about 50 microns or less, about 30 microns or less, and/or about 20 microns or less. Nevertheless, mesh 124 may have sufficiently large pores and a sufficient proportion of open area to allow sound waves to travel through mesh 124.

Adhesive 112 may take any suitable form. For example, adhesive 112 may be a pressure-sensitive adhesive. Although depicted in FIG. 1 as a complete ring, adhesive 112 may cover any part of the face of washer 132. Accordingly, the outer shape of adhesive 112 and/or aperture 114 defined by adhesive 112 may not be circular; furthermore, adhesive 112 may not form a closed shape and may not properly define an aperture. Nevertheless, adhesive 112 may be coupled to washer 132 without blocking mesh 124, thus leaving at least the space represented by aperture 114 open.

Adhesive 112 may be of any suitable class of adhesives. In some examples, adhesive 112 may be capable of adhering to stainless steel.

Figure 2:
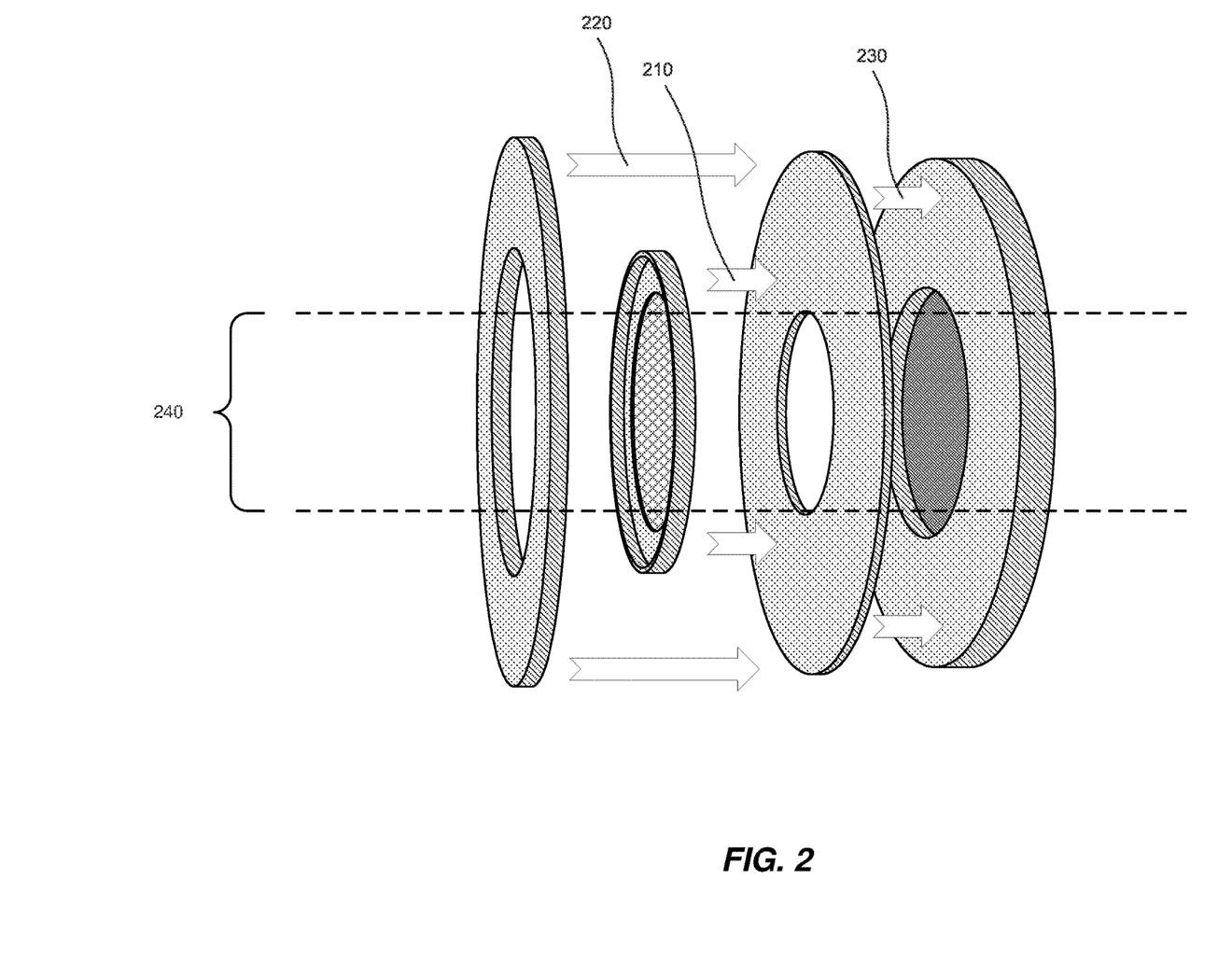
FIG. 2 is an illustration of components of the assembly of FIG. 1 fitting together.

FIG. 2 is an illustration of components of the assembly of FIG. 1 fitting together. As shown in FIG. 2, elements 112, 122, 132, and 142 may each have substantially flat faces, such that these elements may form a stack. Thus, at 210, FIG. 2 shows mesh element 122 stacking flush with washer 132. At 220, FIG. 2 shows adhesive 112 stacking flush with washer 132 (and around mesh element 122). At 230, FIG. 2 shows washer 132 stacking flush with membrane element 142.

In some examples, the various apertures of elements 112, 122, 132, and 142 may be substantially aligned. Thus, the assembly of elements 112, 122, 132, and 142 may form a channel 240 through which sound waves may travel. In some examples, some apertures of elements 112, 122, 132, and 142 may be larger or smaller than other apertures. For example, FIG. 2 illustrates aperture 134 of washer 132 as having a smaller aperture than membrane element 142. Nevertheless, in some examples, the apertures of elements 122, 132, and 142 may be roughly or substantially similar. In one example, the greatest difference in the aperture area among elements 122, 132, and 142 may not exceed 20%.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 80% met, at least about 90% met, at least about 95% met, at least about 99% met, or fully met.

Figure 3:
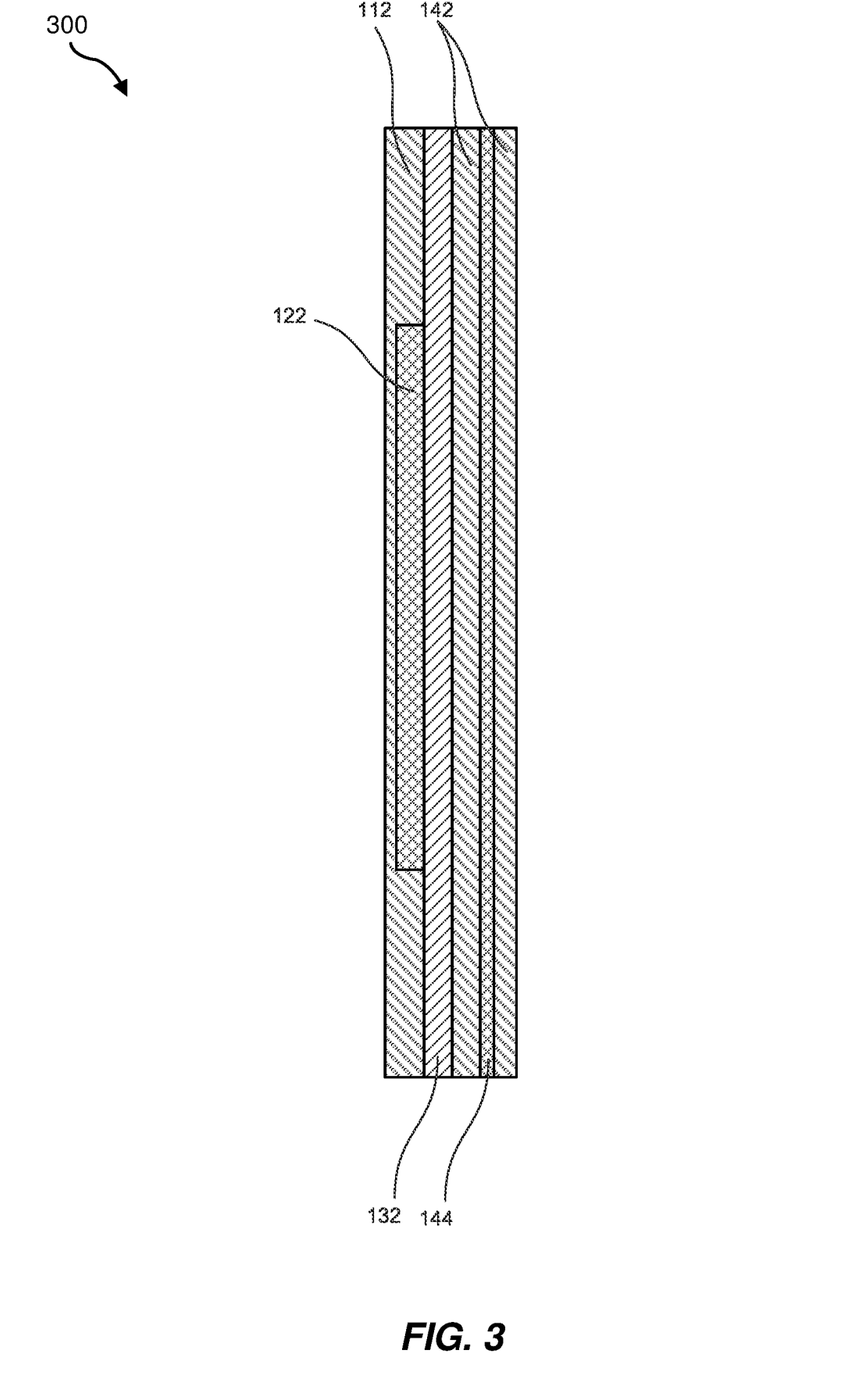
FIG. 3 is a cross section view of an assembly for water-resistant microphones.

FIG. 3 is a cross section view of an assembly 300 for water-resistant microphones. As shown in FIG. 3, adhesive 112 may be coupled flush with washer 132 (while surrounding mesh element 122). Likewise, mesh element 122 may be coupled flush with washer 132. Similarly, washer 132 may sit flush with membrane element 142. Membrane element 142 may contain membrane 144 as an internal layer.

Figure 4:
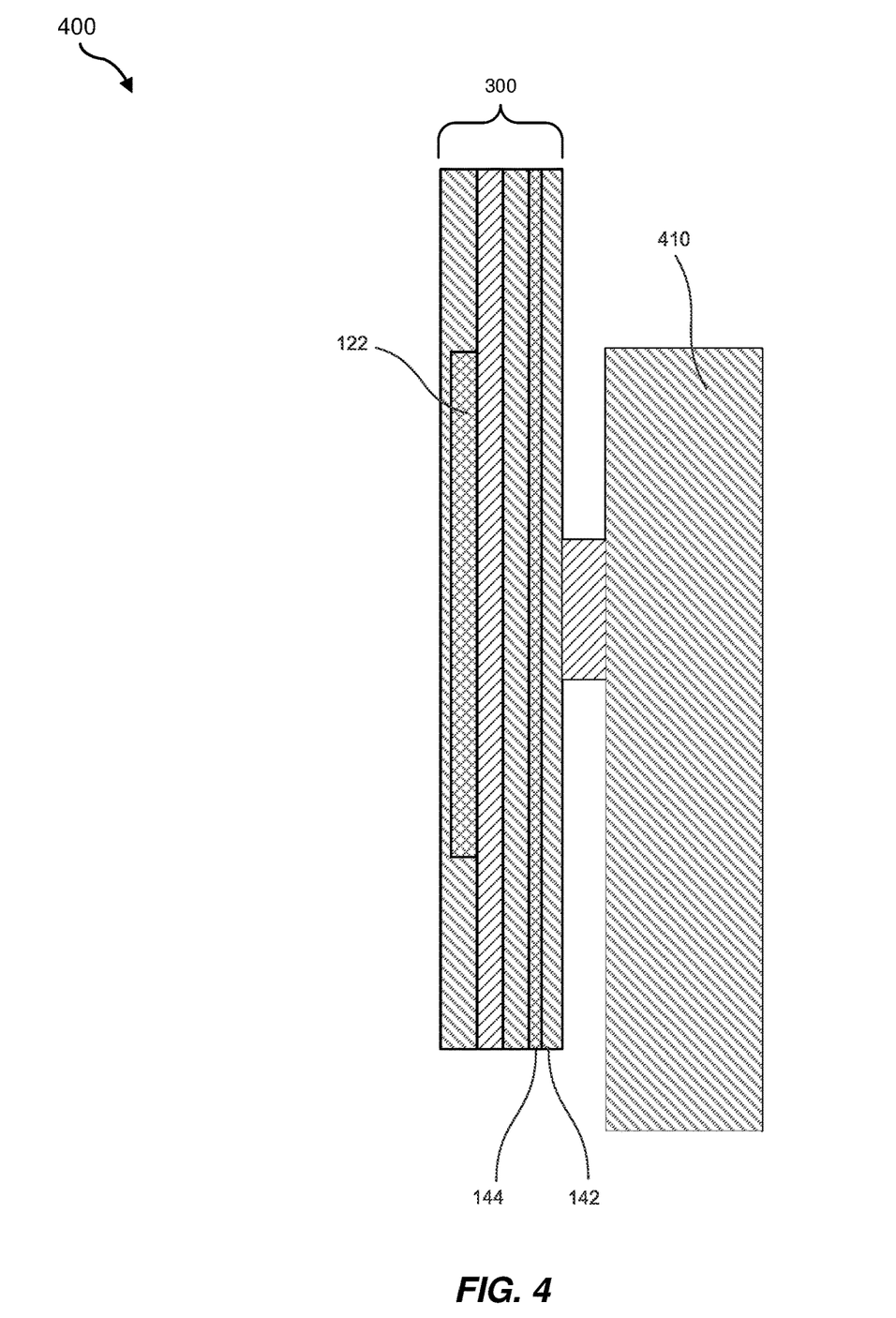
FIG. 4 is a cross section view of the assembly of FIG. 3 with additional elements.

FIG. 4 is a cross section view of the assembly 300 of FIG. 3 with additional elements. As shown in FIG. 4, an assembly 400 may include assembly 300 adjoined and/or coupled to a microphone module 410. Thus, for example, channel 240 illustrated in FIG. 2 may channel sound waves to microphone module 410 (having been transmitted by membrane 144). In some examples, a transducer in microphone module 410 may then convert the sound waves into a signal. In some examples, a housing defining the sole aperture into microphone module 410 may be flush with membrane element 142, meaning that channel 240 may represent the only permeable entry to microphone module 410. Thus, any air reaching microphone module 410 must first pass through mesh 124 of mesh element 122 (protecting membrane 144 and microphone module 410 from dust and invasive objects) and then membrane 144 (protecting microphone module 410 from water).

Figure 5:
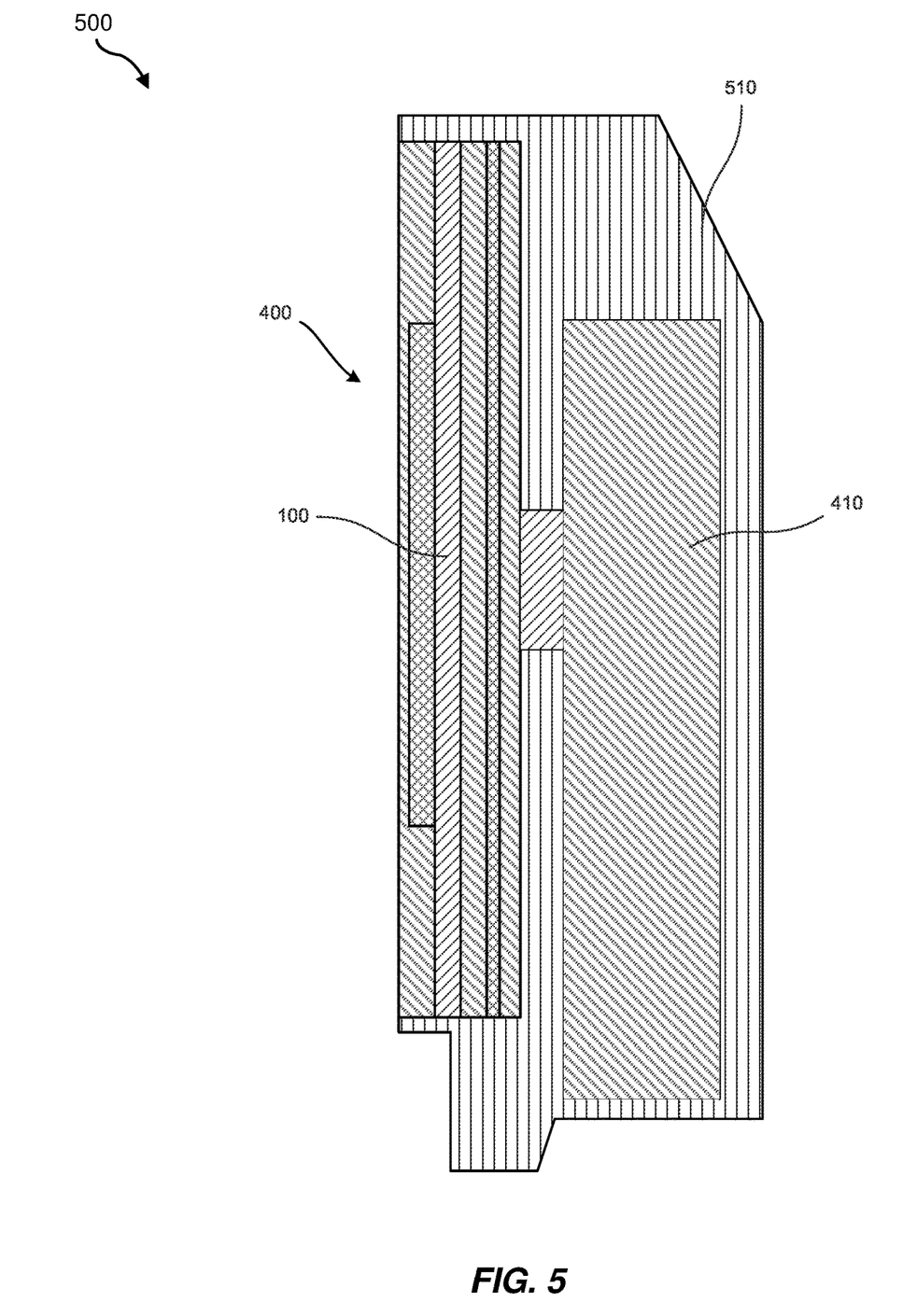
FIG. 5 is a cross section view of the assembly of FIG. 4 with additional elements.

FIG. 5 is a cross section view of the assembly 400 of FIG. 4 with additional elements. As shown in FIG. 5, an assembly 500 may include a bracket 510 holding assembly 400. In some examples, bracket 510 may serve to hold assembly 100 and microphone module 410 together. Furthermore, in some examples, bracket 510 may serve to hold parts of assembly 100 together (e.g., while mesh element 122 may be welded to washer 132, elements 122 and 132 may be held together with membrane element 142 at least partly by bracket 510). Additionally or alternatively, bracket 510 may serve to hold assembly 400 in place in the context of a larger device. In further embodiments, additional adhesive (e.g., pressure-sensitive adhesive) may be used to secure parts of assembly 100 together (e.g., membrane element 142 to washer 132, membrane element 142 to microphone module 410, etc.). In some embodiments, the bracket 510 may be omitted and adhesives and/or welding may be used to secure each of the elements of assembly 400 to each other.

FIG. 6 is a cross section view of the assembly of FIG. 5 installed in a device housing. As shown in FIG. 6, a device 600 may include a housing 610 that includes, inter alia, assembly 500. Housing 610 may define a channel 612. Pressure sensitive adhesive 112 may be coupled to housing 610, thereby fixing assembly 100 (and, e.g., assembly 400 and/or assembly 500) in place within housing 610.

FIG. 7 is an illustration of sound waves 720 propagating through the assembly 600 of FIG. 6. As shown in FIG. 7, assembly 600 may be configured such that sound waves 720 may pass through channel 612 and reach assembly 500 (and pass through channel 240, reaching microphone module 410).

FIG. 8 is a flow diagram of an example method of manufacture 800 for an assembly for water-resistant microphones. As shown in FIG. 8, at step 810, method 800 may include laser welding a stainless-steel mesh to a washer. For example, mesh element 122 of FIG. 1 may be laser welded to washer 132, such that mesh 124 covers aperture 134.

At step 820, method 800 may include coupling the washer to a housing using an adhesive. For example, washer 132 of FIG. 1 may be coupled to housing 610 of FIG. 6 using pressure-sensitive adhesive 112.

At step 830, method 800 may include assembling the stainless-steel mesh coupled to the washer with an air-permeable membrane that is waterproof and a microphone module. For example, the already coupled stainless-steel mesh element 122 and washer 132 may be assembled with membrane element 142 (e.g., with an adhesive and/or weld, with bracket 510, etc.) and microphone module 410.

By laser welding mesh element 122 to washer 132 instead of, e.g., directly to housing 610, method 800 may reduce the difficulty, cost, and potential errors of manufacture. In various examples, step 810 may precede steps 820 and 830. Thus, the laser welding process may be conducted without the potentially difficulties and/or space constraints imposed by performing welding mesh element 122 to the housing. This may also avoid cosmetic damage to the housing that may otherwise sometimes happen during the welding process. Furthermore, it may be easier to hold mesh element 122 to washer 132 in a separate environment than to hold mesh element 122 to the housing for welding. Finally, by performing welding operations in a separate environment, there may be no risk of damaging membrane 144 during the welding operations.

FIG. 9 is an illustration of an exemplary smartwatch 900 that may be used in connection with embodiments of this disclosure. As shown in FIG. 9, smartwatch 900 may have a microphone assembly 904 (in accordance, e.g., with one or more embodiments described herein). The assemblies and apparatuses herein may fit within a limited space afforded by smartwatch 900 while providing protection for the microphone against dust, water, sharp objects, etc. Furthermore, microphone assembly 904 may be installed with minimal risk of damage to smartwatch 900. In addition, the manufacturing process of smartwatch 900 may be simplified, performed more quickly and/or at less expense by avoiding requiring an awkward process of welding a mesh directly to the housing of smartwatch 900.

As described above, a microphone assembly may include a membrane that is both waterproof and air-permeable. The membrane may function as a diaphragm, vibrating when struck by sound waves and, thereby, relaying the sound waves to a microphone module. The membrane may protect the microphone module from water, while allowing enough air to pass through to regulate air pressure (e.g., in the case of thermal expansion of air and/or one or more components of the microphone module).

Example Embodiments

Example 1: An apparatus including an air-permeable membrane that is waterproof; a washer adjacent to the air-permeable membrane; a mesh coupled to the washer that covers an aperture defined by the washer; and an adhesive coupled to a face of the washer distal from the air-permeable membrane.

Example 2: The apparatus of claim 1, where the air-permeable membrane is configured to act as an acoustic diaphragm that relays sound waves by vibrating when struck by sound waves.

Example 3: The apparatus of any of Examples 1 and 2, where the air-permeable membrane is waterproof up to at least about 5 atm.

Example 4: The apparatus of any of Examples 1-3, where the mesh is laser-welded to the washer.

Example 5: The apparatus of any of Examples 1-4, where the mesh is a stainless-steel mesh.

Example 6: The apparatus of any of Examples 1-5, where the mesh permits air flow and blocks particulate matter.

Example 7: The apparatus of any of Examples 1-6, where the washer is stainless steel.

Example 8: A device including a housing; a microphone module within the housing; and an apparatus adjacent to the microphone module, the apparatus including (i) an air-permeable membrane that is waterproof, (ii) a washer adjacent to the air-permeable membrane, (iii) a mesh coupled to the washer that covers an aperture defined by the washer, and (iv) an adhesive coupling the washer to the housing.

Example 9: The device of Example 8, where the adhesive includes a pressure-sensitive adhesive.

Example 10: The device of any of Examples 8-9, where the housing defines an air channel through which sound waves enter the housing.

Example 11: The device of any of Examples 8-10, where the apparatus sits between the air channel and the microphone module, such that sound waves passing through the air channel pass through the mesh and the washer aperture and strike the air-permeable membrane.

Example 12: The device of any of Examples 8-11, incorporating the apparatus from Example 2.

Example 13: The device of any of Examples 8-12, incorporating the apparatus from Example 3.

Example 14: The device of any of Examples 8-13, incorporating the apparatus from Example 4.

Example 15: The device of any of Examples 8-14, incorporating the apparatus from Example 5.

Example 16: The device of any of Examples 8-15, incorporating the apparatus from Example 6.

Example 17: The device of any of Examples 8-16, incorporating the apparatus from Example 7.

Example 18: A method of manufacturing a device including laser welding a stainless=0steel mesh to a washer; coupling the washer to a housing using an adhesive; and assembling the stainless-steel mesh coupled to the washer with (i) an air-permeable membrane that is waterproof and (ii) a microphone module.

Example 19: The method of Example 18, where laser welding the stainless-steel mesh to the washer precedes coupling the washer to the housing.

Example 20: The method of any of Examples 18-19, where laser welding the stainless-steel mesh to the washer precedes assembling the stainless-steel mesh with the air-permeable membrane and the microphone module.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality system 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable for the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus for detecting sound waves, the apparatus comprising:
   an air-permeable membrane that is waterproof;
   a stainless-steel washer adjacent to the air-permeable membrane;
   a mesh laser-welded to the washer that covers an aperture defined by the washer, wherein the aperture of the washer is positioned between the mesh and the air-permeable membrane; and
   an adhesive coupled to a face of the washer distal from the air-permeable membrane and configured to secure the washer to a housing.

2. The apparatus of claim 1, wherein the air-permeable membrane is configured to act as an acoustic diaphragm that relays sound waves by vibrating when struck by sound waves.

3. The apparatus of claim 1, wherein the air-permeable membrane is waterproof up to at least about 5 atm.

4. The apparatus of claim 1, wherein the mesh comprises a stainless-steel mesh.

5. The apparatus of claim 1, wherein the mesh permits air flow and blocks particulate matter.

* * * * *